US006553798B1

(12) United States Patent

Larsen et al.

(10) Patent No.: US 6,553,798 B1
(45) Date of Patent: Apr. 29, 2003

(54) DOOR BLOCK FOR CONTAINER

(76) Inventors: Allan R Larsen, Ramløsevej 59, Helsinge (DK), 3200; Henning Kummerfeldt, Krydservej 29, Jyllinge (DK), 4040

( * ) Notice: Subject to any disclaimer, the term of this patent is extended or adjusted under 35 U.S.C. 154(b) by 229 days.

(21) Appl. No.: 09/654,045

(22) Filed: Sep. 1, 2000

(30) Foreign Application Priority Data

Sep. 22, 1999 (DK) ........................................ 1999 01348

(51) Int. Cl.[7] ................................................ B60R 25/02

(52) U.S. Cl. .............................. 70/211; 70/417; 70/56; 292/240

(58) Field of Search .............................. 70/54–56, 101, 70/201–203, 211, 212, 417; 292/307 R, 240, 307 B

(56) References Cited

U.S. PATENT DOCUMENTS

| | | | | |
|---|---|---|---|---|
| 4,627,248 A | * | 12/1986 | Haworth | 70/134 |
| 4,898,008 A | * | 2/1990 | Eberly | 70/56 |
| 5,165,263 A | | 11/1992 | Perron et al. | 70/177 |
| 5,284,036 A | * | 2/1994 | Rosenbaum | 70/14 |
| 5,388,435 A | | 2/1995 | Bailey | 70/101 |
| 5,491,992 A | * | 2/1996 | Mandall | 70/417 X |
| 5,553,904 A | | 9/1996 | Lorenzo | 292/307 R |
| 5,562,316 A | * | 10/1996 | Bullock et al. | 292/202 |
| 5,676,000 A | * | 10/1997 | Chen | 70/209 |
| 5,718,133 A | * | 2/1998 | Chen et al. | 70/211 X |
| 5,735,146 A | * | 4/1998 | Taplin | 70/56 |
| 5,755,175 A | * | 5/1998 | White et al. | 292/307 R |
| 5,775,747 A | | 7/1998 | Navarsky | 292/307 B |
| 5,791,702 A | | 8/1998 | Liroff | 292/307 R |
| 5,857,721 A | | 1/1999 | Liroff | 292/307 R |
| 5,934,116 A | * | 8/1999 | Moore | 70/212 |
| 6,036,240 A | * | 3/2000 | Hamilton et al. | 70/417 X |

FOREIGN PATENT DOCUMENTS

| | | |
|---|---|---|
| EP | 0 554 509 | 8/1993 |
| GB | 2 337 079 | 11/1999 |

* cited by examiner

*Primary Examiner*—Suzanne Dino Barrett
(74) *Attorney, Agent, or Firm*—Pennie & Edmonds LLP

(57) ABSTRACT

A door block (9) serving for blocking a door (2), which is side-hinged on a casing (3) around an opening in a container wall, against being opened by unauthorized persons. The door block comprises a rotatable closing rod (5), a handle (6) on the closing rod and a cam (7) fitted on the closing rod for engaging a keeper (8) on the casing when the door is closed and the closing rod rotated into closed position by means of the handle. The door block furthermore comprises a, seen in cross section, mainly U-shaped covering (14) having a body (16) and two flaps (17) projecting from this body, and in the blocking position extending across the closing rod with a piece of this rod located in flushing cuts (18) in the flaps and the handle encompassed between the body and the flaps; a catch hook (19) pivotally mounted in the covering for locking the closing rod in the cuts of the flaps by means of a projection (26) on the catch hook; and a lock (13) for locking the catch hook in its locking position. The door block has a simple and effective structure. It is easy to apply as it does not require any use of tools nor any kind of manipulation in the structure of the respective door. It is furthermore difficult to break open, and a possible burglary is clearly revealed by the condition in which the door block will be left by the burglary.

21 Claims, 6 Drawing Sheets

DOOR BLOCK FOR CONTAINER

FIELD OF THE INVENTION

The invention relates to doors of the above kind widely used in e.g. commercial vehicles with closed cargo space or in stationary and transportable containers. More particularly, the invention relates to a door block for such a door.

BACKGROUND OF THE INVENTION

The invention relates to a door block for a door which is hinged on a casing around an opening in a wall, whereby the door comprises a rotatable closing rod, a handle on the closing rod and a cam fitted on the closing rod for engaging a keeper on the casing when the door is closed and the closing rod rotated into closed position by means of the handle, and the door block comprises blocking means arranged to in the blocking position extend across the closing rod with parts which, at least on the side of the closing rod that is facing in the opposite direction of the handle, are near the outer side of the door, and locking means mounted on the blocking means and arranged to, in the blocking position of the door block, lock the blocking means to the closing rod.

Doors of the above kind are widely used in e.g. commercial vehicles with closed cargo space or in stationary and transportable containers. In order to facilitate un- and loading, these doors are normally mounted in one of the ends of the respective container.

During transport and storage the doors are kept closed by one or several closing rods which often are locked in the locking position for protection against theft by means of e.g. a padlock that locks the handle to lock fittings on the door.

Doors locked in this way are however broken open relatively easily and quickly by sawing the handle over or breaking it or the lock fittings.

A door block with the above-mentioned blocking means and locking means can however protect the door far more securely against being broken open. If the door block is locked to the closing rod by means of the locking means, the rotation of the closing rod is blocked in the opening direction by the blocking means which on the side facing oppositely of the handle will hit the outer side of the door. The cam of the rod can therefore not be disengaged from the corresponding keeper on the casing, the result of which is that the door can be kept locked securely and effectively by the door block.

Such a door block is known from U.S. Pat. No. 5,775,747. In this case, the door block has blocking means in form of two separate parts which by mounting on the door are pushed together around the closing rod and locked in this position by means of a separate bolt. The two blocking parts are curved on the side facing the closing rod. In assembled and locked condition, the door block can therefore not be pulled free of the closing rod. The blocking part facing in the opposite direction of the handle hits the outer side of the door at attempts to rotate the handle in the opening direction. Thereby the door is effectively secured against being broken open.

This known door block is however relatively difficult to handle as it consists of three separate parts which only form the desired door block at assembly around the closing rod. Correspondingly, the three parts have to be separated from each other on site before they can be disengaged from the closing rod so that this rod can be rotated and the door opened.

The two blocking parts are assembled by means of a coupling wall which is made on one of the parts and inserted in the second part at assembly around the closing rod. However, there is only room for the coupling wall to have a limited thickness, and it can therefore not for certain absorb the relatively great moment that will affect it when an unauthorized person pulls hard on the handle in an attempt to open the door. In this case there is a risk of the coupling wall being bent so that the closing rod can be rotated after all. The known door block is therefore not able to for certain provide the required maximum security against burglary.

A corresponding door block is known from U.S. Pat. No. 5,791,702 that also consists of two separate blocking parts which have to be assembled on site in order to form the door block. The two parts are after assembly locked together with a separate bolt. One of the blocking parts is in this case shaped as a short, box-shaped length of pipe which at mounting is pushed in over the handle. The second blocking part is shaped as a double branched bracket, one branch of which is pushed into and locked in the box-shaped length of pipe at mounting. This door block is somewhat more difficult to handle than the door block known from U.S. Pat. No. 5,775,747.

SUMMARY OF THE INVENTION

The object of the invention is to provide a door block of the kind mentioned in the opening paragraph that is easy and convenient to use, that has a simple and inexpensive design, that can be used without having to use tools and without having to manipulate the structure of the respective door at all, that offers the greatest possible resistance against breaking open, and that clearly reveals if a burglary has taken place.

The novel and unique features according to the invention, whereby this is achieved, is the fact that the blocking means consist of a, seen in cross section, mainly U-shaped covering in form of a body having projecting flaps extending to the proximity of the outer side of the door in the locking position of the door block and together with the body during this encompassing the part of the handle that adjoins the closing rod, that in the flaps of the covering are made flushing cuts for in the blocking position receiving the closing rod, and that the locking means comprise a catch hook pivotally mounted in the covering and having a projection for in the blocking position locking the closing rod in the cuts, and a lock for locking the catch hook in its locking position.

As the door block according to the invention consists of only one single part, it can be mounted on and demounted of a closed door easily and quickly and without use of tools. The U-shaped covering of the door block can without difficulty be dimensioned to be able to absorb the moment from a hard pull on the handle. The door block therefore provides maximum security against burglary.

The application of the door block does not require any manipulation of the door, and a mounted door block cannot be removed from the locking position on the door without conspicuous damages which immediately would reveal the burglary.

When the covering furthermore is made of a strong material such as hardened or case-hardened steel, and has a relatively great material thickness, the door will be very difficult to break open, and a burglary will take relatively long time even if heavy tools are used for the purpose.

In a preferred embodiment the catch hook can in an angular distance from the first projection have a second projection which is arranged in such a way that the closing rod during insertion in the cuts of the flaps turns the catch hook into locking position.

Thereby the process of fixing the door block on the door is facilitated considerably, as the door block will put itself in the correct locking position by merely being pushed in over the respective closing rod.

The door block can furthermore be fixed securely and correctly on the door with merely one single motion of the hand when the catch hook only can pivot between a first angular position in which the first projection is beyond and the second is within the constraint of the cuts, and a second angular position in which the first projection is within and the second beyond this constraint.

In the first angular position the door block can simply be pushed in over the closing rod. In the second angular position the catch hook has locked itself on the closing rod so that the door block cannot be removed without being destroyed.

By letting the two projections of the catch hook pass into each other via a cylinder face section having the same or just slightly larger radius than the radius of the closing rod, the closing rod is able to successively turn the catch hook smoothly and slidingly from its first to its second angular position and vice versa when the door block is mounted on and demounted of the door, respectively. In fixed position the door block is furthermore firmly fixed almost without looseness on the closing rod.

When the cuts are extending obliquely outward in the flaps of the covering, the door block will be especially firmly fixed on the closing rod in the locking position. This advantage is obtained because a part of the flaps of the door block then will be extending behind the closing rod and thereby together with the locking projection of the catch hook contribute essentially to the strength of the door block against being pulled or broken off of the closing rod. An unauthorized person will therefore not be able to open the door without breaking the door block with heavy tools.

In a simple and effective embodiment the catch hook can have a first part provided with the two projections and a second part extending mainly perpendicularly from the first and arranged to lock the catch hook in its locking position in cooperation with the lock.

As lock there can be used a conventional padlock or a C-shaped lock which is fastened in the covering and locks with a bolt acting as stop to the second part of the catch hook when the catch hook is in the locking position.

In a second embodiment a cylinder lock can be used which is mounted in a housing with an axis extending crosswise to the flaps of the covering, in the housing is constructed partly an axial opening for a bolt, partly a transverse cut connecting the axial opening to the interior of the covering.

The catch hook can then be arranged in such a way that its second part is extending into the axial opening via the transverse opening when the catch hook is in the first angular position and is out of the axial opening when the catch hook is in the second angular position.

When the swivelling axis of the catch hook, the first projection and the end face of the second part are situated in each their peak of a triangle and a bolt is placed in the axial opening of the lock housing, the catch hook is forced to be in the second angular position, i.e. in the locking position, as the second part of the bolt is now prevented from swinging into the axial opening and thereby allowing the disengagement of the locking engagement of the catch hook.

BRIEF DESCRIPTION OF THE DRAWINGS

The invention will be explained in greater detail below, describing only exemplary embodiments with reference to the drawing, in which.

DETAILED DESCRIPTION OF PREFERRED EMBODIMENTS

Figure 1:
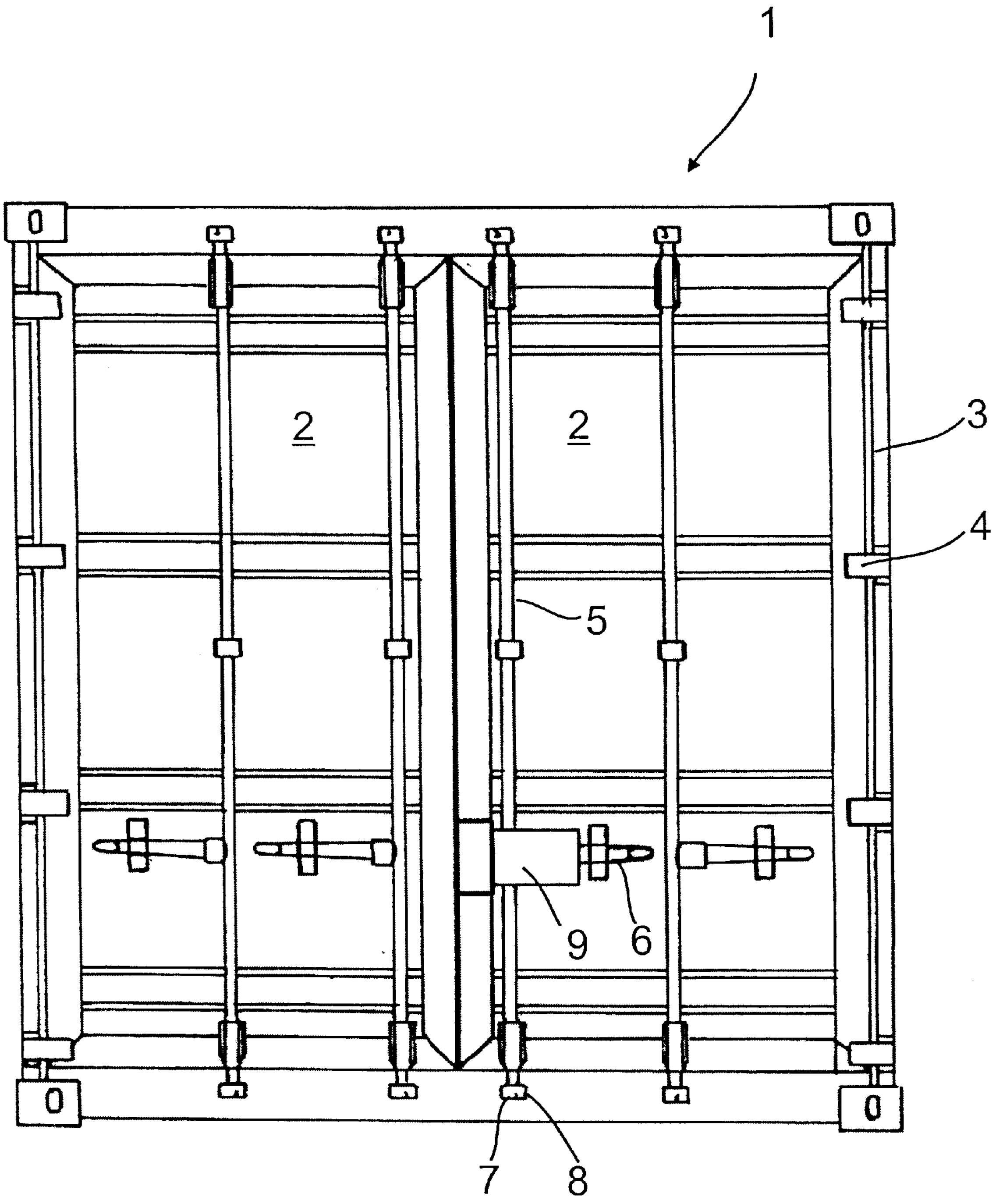
FIG. 1 shows the end of a container having two side-hinged doors, one of which is fixed by means of a door block according to the invention, which is only shown schematically.

FIG. 1 shows a container end 1 with two container doors 2 hinged on a casing 3 by means of hinges 4.

In this case each door has two rotatable closing rods 5 which by means of a handle 6 can be rotated into locking position. Each closing rod has an upper and bottom cam 7 for engaging with corresponding keepers 8 on the casing when the door is closed. The door can be reopened when the closing rod is rotated back, and the cams 7 thereby disengaged from the keepers 8.

On one of the closing rods is fixed a door block 9, only shown schematically, for preventing the closing rod from being rotated back. Thereby the door can be locked with a lock (not shown) on the door block.

Figure 2:
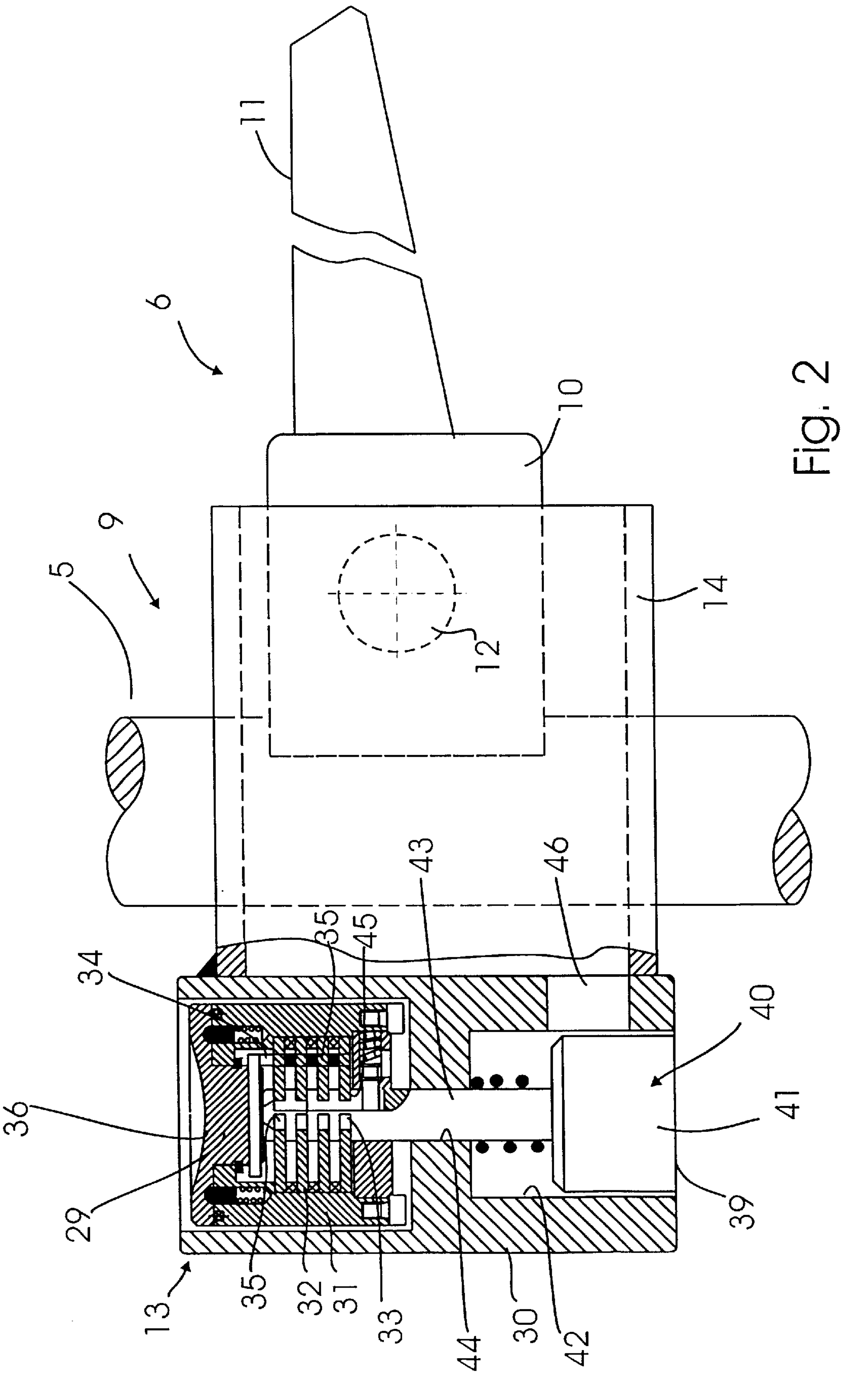
FIG. 2 is on a larger scale a front view of the door block in FIG. 1 partly in section.

FIG. 2 is on a larger scale a fractional view of the door block 9 in FIG. 1 with some of the parts left out in order to better survey the figure.

The door block is detachably mounted on the closing rod 5. In the figure is furthermore seen a handle 6 belonging to the closing rod, the handle consists of a bearing bracket 10 fastened to the closing rod and an actual handle 11 which via a swivel pin 12 is pivotally mounted on the bearing bracket.

FIG. 2 furthermore shows that the door block has a lock 13 on a covering 14 encompassing a piece of the closing rod 5 and the bearing bracket 10 of the door handle. The significance of the lock and the covering will be explained in detail below.

Figure 3:
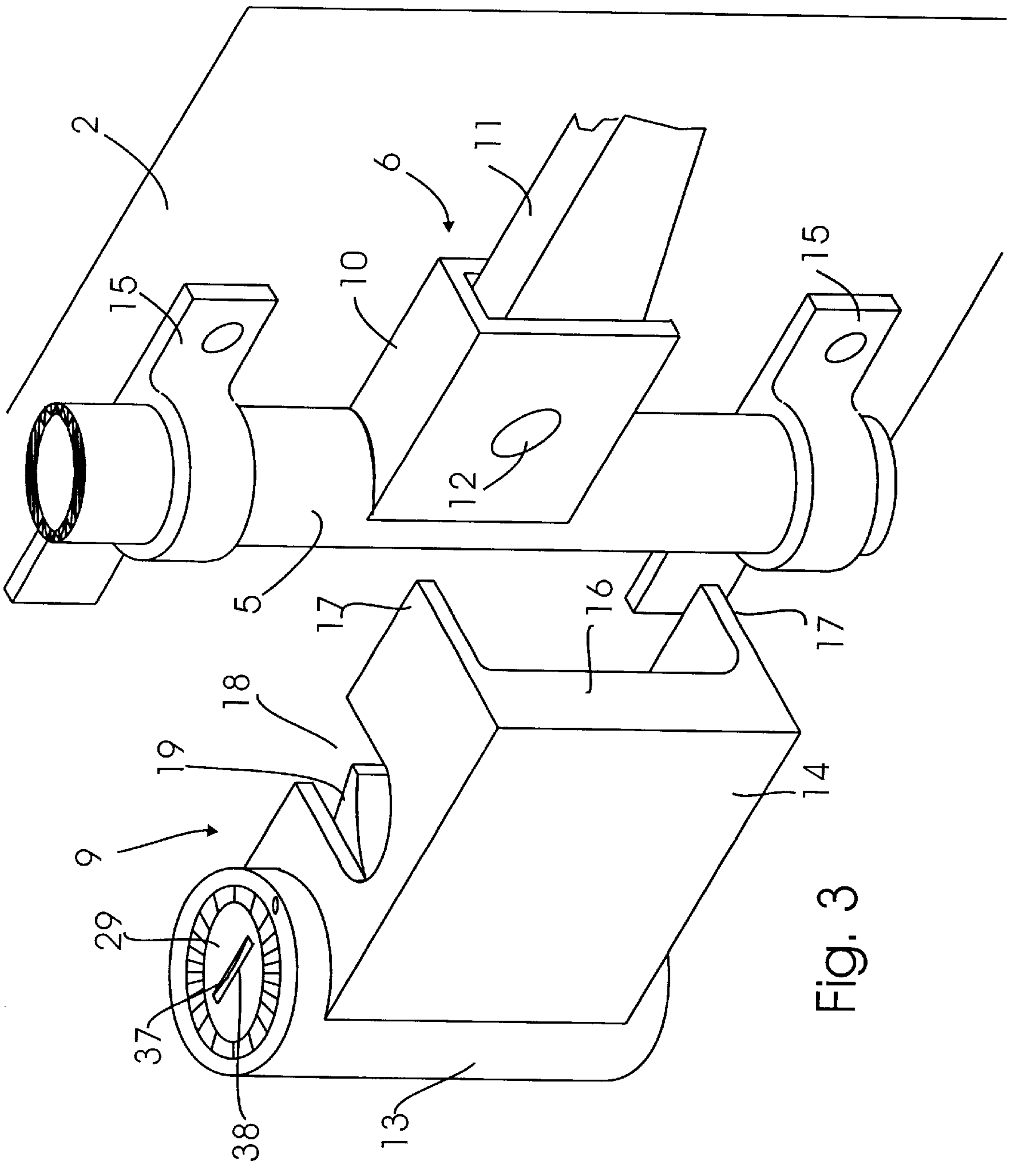
FIG. 3 is a perspective fractional view of a door of the container and a door block according to the invention.

FIG. 3 is a perspective view in detail, but from a different angle, of the arrangement of the above-mentioned arrangement with the door block 9 in position to be mounted on the closing rod 5. As can be seen is the closing rod 5 rotatably journaled in bearings 15 mounted on the door 2 only partly shown.

The covering 14 is shaped as a strong U-section consisting of a body 16 with a stop 16' (FIGS. 5 and 6) and two flaps 17, and it is made of a strong material, such as hardened or case-hardened steel. A person trying to obtain access to the container without authorization would therefore have difficulty in breaking the covering and thereby remove the door block so that the door can be opened.

In each of the flaps is made a cut 18 that fits the closing rod 5, and inside the covering is a pivotal catch hook 19.

Figure 4:
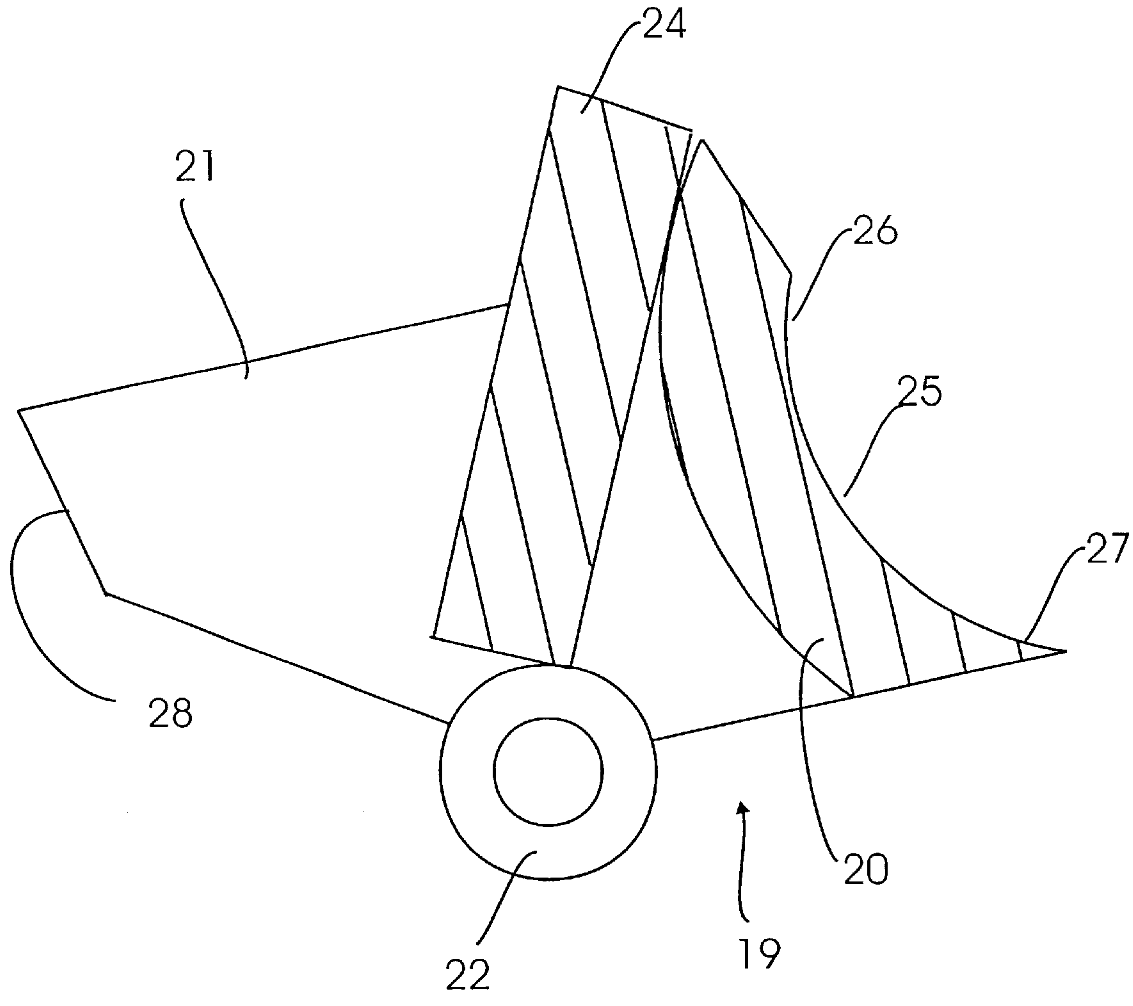
FIG. 4 is on a larger scale a view of a catch hook for the door block in FIGS. 1–3.

This catch hook, which is shown on a larger scale in FIG. 4, consists of a first part 20 and a second part 21 preferably extending perpendicularly from the first part.

On the second part of the catch hook is a bearing 22. The catch hook is furthermore strengthened by a stiffening member 24.

The first part 20 of the catch hook has an exterior curved surface 25 having the same or only slightly larger radius than the radius of the closing rod 5. This curved surface ends in a first rim zone 26 and a second rim zone 27. The second part 21 of the catch hook has an end edge 28.

The first rim zone 26 and the end edge 28 and the bearing 22 of the catch hook are each in their peak in a triangle so that the first rim zone 26 and the end edge 28 of the second part each form a lever arm for by a compressive force against the respective parts 28,26 turning the catch hook in opposite directions about the swivelling axis of the bearing 22.

Figure 5:
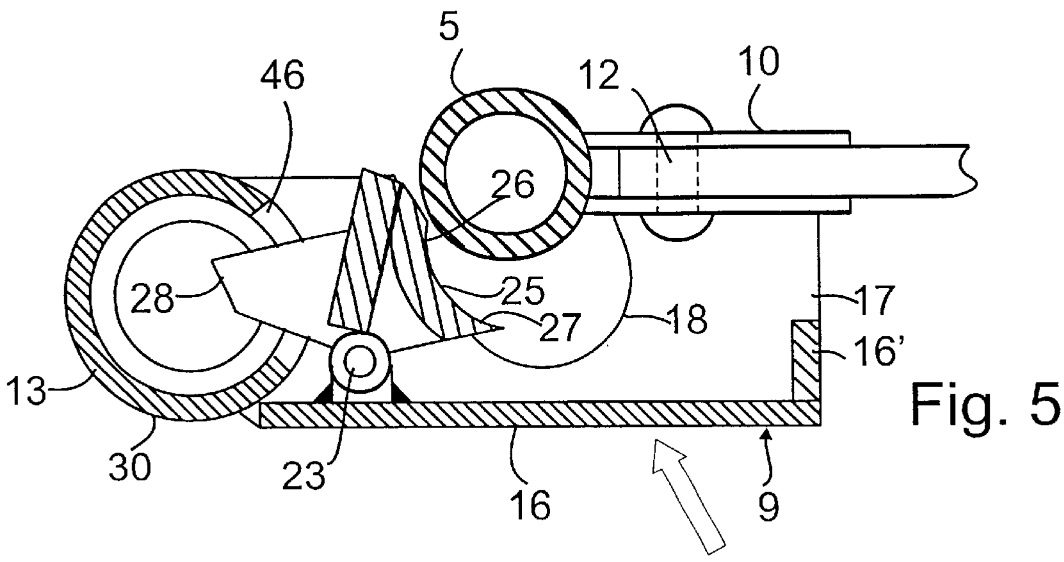
FIG. 5 is a plan sectional view of the door block during mounting on the door.
Figure 6:
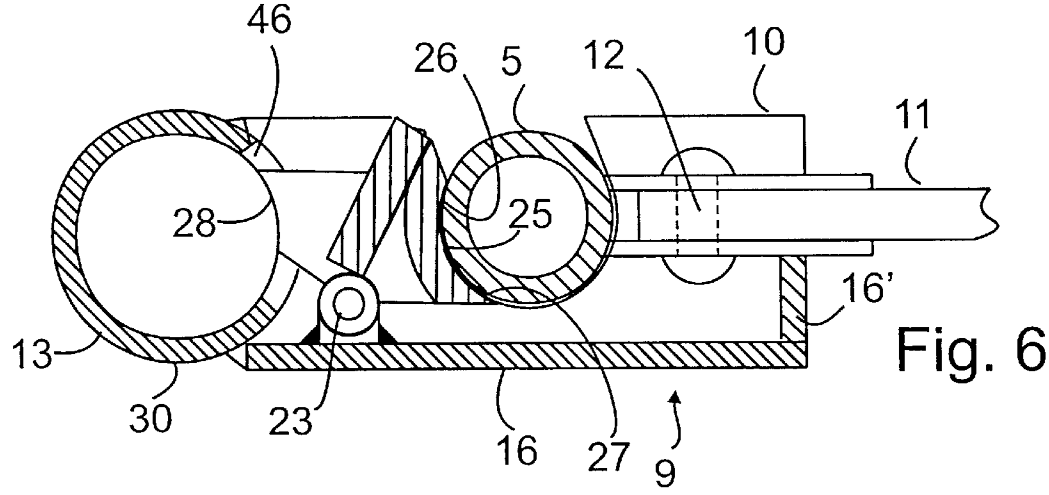
FIG. 6 is the door block in FIG. 5 but with the door block mounted.
Figure 7:
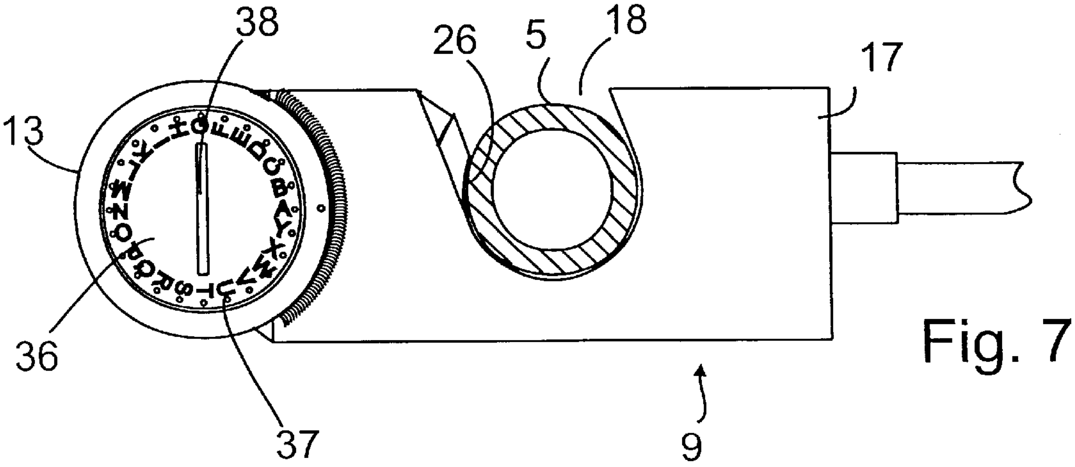
FIG. 7 is a plan view of the door block in FIG. 5.

FIGS. 5–7 are partly longitudinal sectional views through the body of the covering and show the arrangement of the door block in detail and also how it can be detachably mounted on the closing rod and prevent this rod from being rotated back from the locking position.

As can be seen is the catch hook in FIG. 4 pivotally mounted in the covering 14 by means of a swivel pin 23 inserted through the bearing 22 and having an axis which is perpendicular to the flaps 17 of the casing.

The lock 13 in FIGS. 5–7 is seen in greater detail in the longitudinal section in FIG. 2 which shows a combination lock 29 built in a lock housing 30 fastened at the end of the covering 14.

The combination lock 29 which is of a kind known per se has a cylinder 31 with four annular tumblers 32 each having a tumbler key 33 facing radially inward. The lock is coded by pins 34 which are put in holes 35 placed at equidistant angular distances in each of the tumblers.

The tumblers 32 can be rotated by means of a turnable knob 36 and there is, as shown in FIG. 7, a scale 37 on the face of the combination lock 29. The knob 36 can e.g. be turned by means of a coin interlocking with a slot 38 on the face of the knob and which furthermore functions as an indicator for indicating the actual code position.

The lock housing 30 has an axial opening 39 for receiving a bolt 40 having a head 41 received by a first opening section 42 with a larger diameter whereas the rest 43 of the bolt is lead through a second opening section 44 with a smaller diameter and into the combination lock where the bolt can be locked by means of circumferential grooves 45 made in the end part of the bolt and serving for receiving the tumbler keys of the tumbler rings at locking.

In FIG. 5 the longitudinal section through the door block is placed on that level where the first opening section 42 of the axial opening having larger diameter is. There is no bolt in the axial opening, and the second part 21 of the catch hook with the end edge 28 can therefore freely swing into the first opening section of the opening via a cut 46 made in the housing and connecting the first opening section to the interior of the covering 14.

In this angular position the first rim zone 26 of the catch hook is turned free or nearly free of the cuts 18 of the flaps whereas the second rim zone 27 of the catch hook at the same time is turned into the cuts.

When the door block 9 is now pushed in towards the closing rod 5 as indicated by the arrow, the first rim zone 26 can pass the closing rod 5 which thereby hits 25 the second rim zone 27 whereby the catch hook is turned to the second angular position shown in FIG. 6 in which the closing rod is located completely inside the cuts 18.

The second rim zone 27 is now turned free of the cuts whereas the first rim zone 26 is turned into the cuts extending obliquely outward in the flaps 17.

The flaps are made with a width that fit the closing rod and when the first rim zone 26 in the second angular position of the catch hook is thus extending in behind the closing rod, it cannot leave the cuts again without first having to turn the catch hook back from the second to the first angular position.

In order to prevent such a return turning, a bolt 40 is, as shown in FIG. 2, pushed into the axial opening of the lock housing with the head 41 of the bolt located in the first opening section 42 of the opening where the head is blocking the second part 21 of the catch hook from swinging into the opening again and thereby making the catch hook leave its second angular position, i.e. the locking position.

Attempts on pulling the door block free of the closing rod will make this closing rod affect the catch hook with a moment of rotation about the swivel pin 23 counterclockwise, seen in FIGS. 5–7.

Thereby the end edge 28 on the second part 21 of the catch hook is made to abut the head 41 of the bolt, said head will in itself affect the catch hook with a reaction moment of rotation about the swivel pin 23 in the opposite direction, namely clockwise.

The head of the bolt and the closing rod thus together keep the catch hook firmly locked in the locking position.

In this position the passage of the closing rod out of the cuts of the flaps is blocked by the first rim zone 26 of the catch hook, which is extending into the cuts. Attempts to pull the door block free of the closing rod will therefore make both the rim zone 26 and the part of the flaps that due to the oblique orientation of the cuts are extending behind the closing rod lean against the closing rod with a forward thrust that is essentially absorbed by the flaps.

For reasons of strength it would therefore be advantageous to let the cuts have the oblique position shown in FIGS. 5–7 on the flaps, it is to be noted though that the structure is also effective if the cuts are perpendicular to the body of the covering.

The operation of fixing the door block on the door is ended with the bolt being locked in the combination lock 29. An unauthorized person trying to obtain access to the container cannot remove the locked door block now without damaging manipulation with heavy tools.

The fact that the door block is locked on the closing rod is however not enough in itself to prevent the closing rod from being rotated and thereby the door being opened.

An additional feature is required that according to the invention consists in the fact that the covering 14 of the door block is extending a distance on both sides of the locked closing rod and at one side over the handle 6 or more specifically its bearing bracket 10.

Thereby the surprising effect is obtained in that the closing rod cannot be rotated out of its locking position. If attempts are made to rotate the closing rod out of its locking position by pulling the handle, the bearing bracket of the handle will hit the stop 16' of the locked covering and will try to thereby turn the covering about the axis of the locked closing rod 5 until its opposite end part hits the door (not shown in FIGS. 5–7).

It is obvious that the door block is arranged in such a way that only a so small turning of the covering is allowed for that the cams of the closing rod cannot be disengaged from the corresponding keepers on the casing of the container door, and the cooperation of the door block with the door and its closing rod therefore effectively obstruct the door from being opened by unauthorized persons.

A person who knows the code to the combination lock can however easily obtain access to the container. This is done by opening the combination lock 29 and pulling the bolt 40 out after which the door block 9 simply can be removed from the closing rod 5 which now can be rotated free of its locking position so that the door can be opened.

As it appears is the door block according to the invention functioning without any form of manipulation in the container which is to be secured against burglary.

The door block is an independent part that freely can be transferred from one container to another which is desired to be secured against burglary.

As many containers frequently are not in use or do not have to be locked, there is no need for as many door blocks as containers. Thereby the investment in locking equipment for securing containers against burglary is reduced considerably.

The invention is described above on the basis that the lock was a combination lock. Within the scope of the invention, a cylinder lock can however also be used that is opened with a key, or where appropriate a completely different kind of lock.

Figure 8:
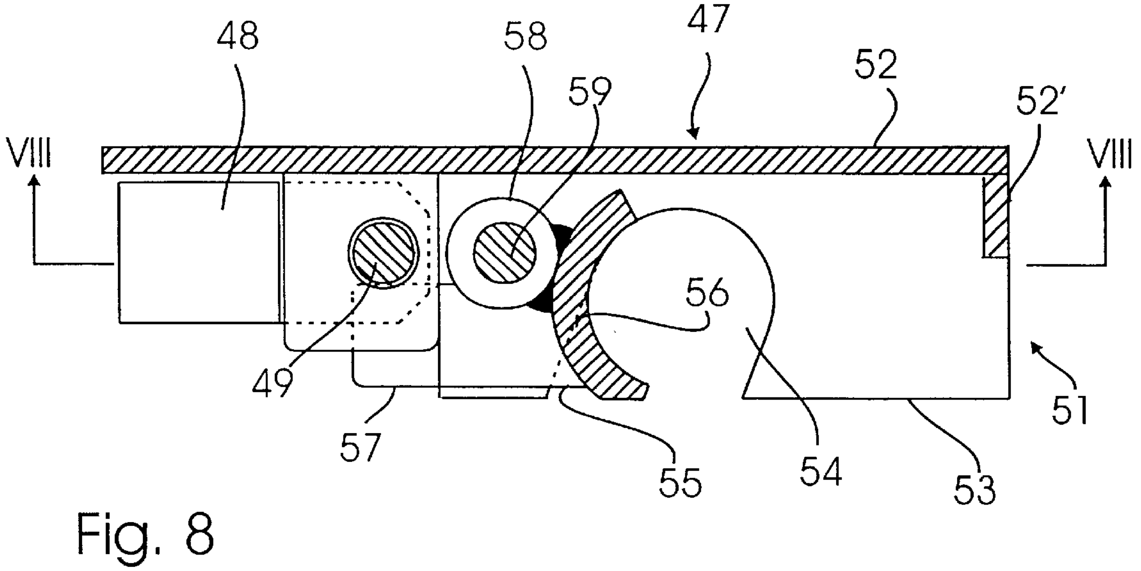
FIG. 8 is a plan view of a second embodiment of a door block according to the invention partly in section.
Figure 9:
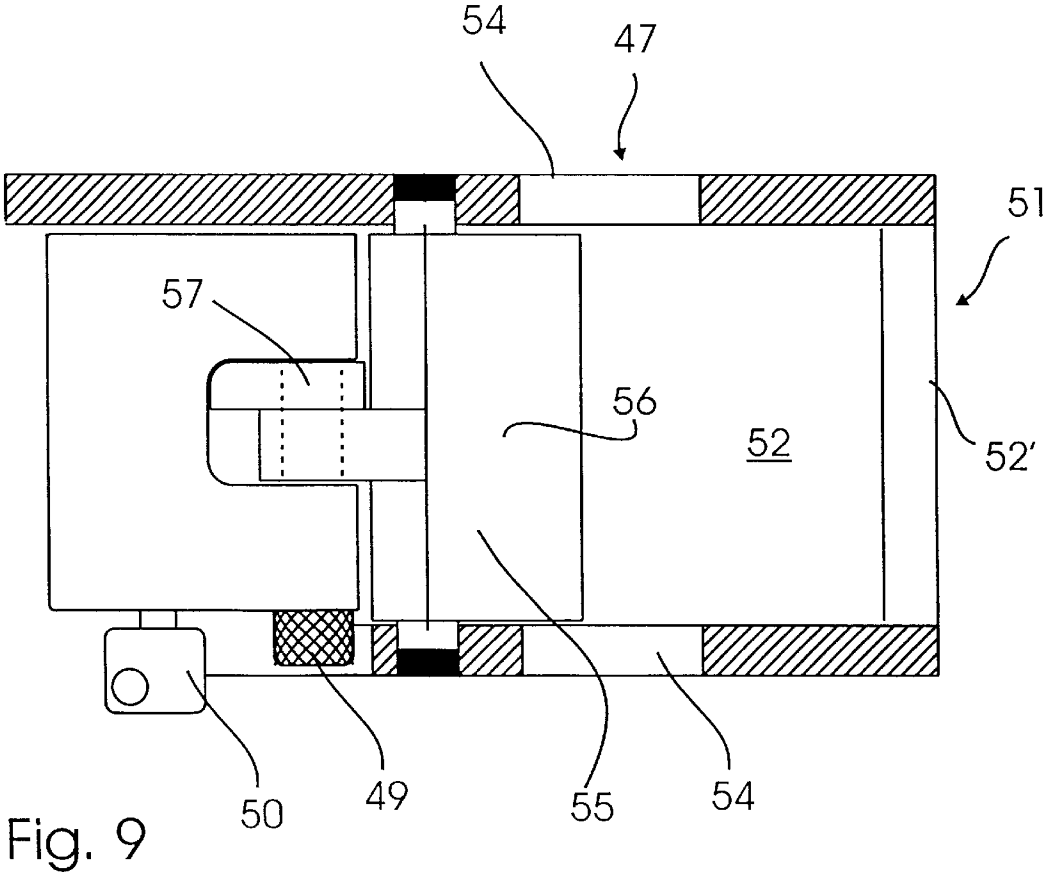
FIG. 9 is a partly sectional view taken along the line VIII—VIII of FIG. 8.

FIGS. 8 and 9 thus show a door block 47 with a C-shaped lock 48 which cooperates with a bolt 49 and is opened with a key 50.

The lock 48 is fastened in a covering 51 consisting of a body 52 with a stop 52' and two flaps 53 with each their inclined cut 54.

In the covering is pivotally mounted a catch hook 55 having a first part 56, a second part 57 and a swivel bearing 58 with a swivel pin 59.

In the position in FIGS. 9 and 8 the catch hook 55 is in its locking position which is kept locked by the bolt 49 which supports the second part 57 of the catch hook.

The function of this second embodiment of the door block according to the invention moreover corresponds to the first-mentioned and will therefore not be described any further at this point.

The door block according to the invention has a simple and effective structure and is suitable for securing both stationary and transportable containers and also commercial vehicles having closed cargo space against burglary.

The door block can be mounted on a door easily and quickly without use of tools and without having to manipulate the door at all in this connection.

The door block is furthermore arranged in such a way that it can withstand breaking open to the greatest extent possible and through relatively long time, and an effected breaking open is clearly revealed by the condition in which the door block would be left by the breaking open.

What is claimed is:

1. A door block (9) for a lockable door (2) which is hinged on a casing (3) around an opening in a wall and has a rotatable closing rod (5) and a handle (6) adjoined to the closing rod, and a cam (7) fitted on the closing rod for engaging with a keeper (8) on the casing when the door is closed and the closing rod is rotated into locking position by means of the handle, the door block comprising:

a positionable blocking means having, when viewed in cross section, a substantially U-shaped covering (14) comprising a body (16) which in a blocking position extends over a portion of the closing rod and, at least on the side of the closing rod that is facing the opposite direction of the handle, extends near the outer side of the door and projecting flaps (17) attached to the body (16), each extending to the proximity of the outer side of the door, wherein the body and the projecting flaps extend across the closing rod (5) and encompass a portion of the handle that adjoins the closing rod and a portion of the closing rod that adjoins the handle, and the flaps (17) include cuts (18) for in the blocking position receiving the closing rod, and locking means mounted on the blocking means and comprising a catch hook (19) pivotally mounted in the covering and having a first projection (26) for locking the closing rod in the openings (18), and a lock (13) for locking the catch hook (19) in its locking position, wherein the locking means is positioned and adapted to, in the blocking position of the door block, lock the blocking means on the closing rod (5).

2. The door block of claim 1, wherein that the catch hook (19) in an angular distance from the first projection (26) comprises a second projection (27) positioned and adapted to interact with the closing rod (5) during insertion of the closing rod in the cuts (18) of the flaps (17) and thereby pivot the catch hook into locking position.

3. The door block of claim 2, wherein that the catch hook (19) is pivotally mounted between a first angular position in which the first projection (26) is disposed beyond the constraint of the cuts (18) and the second projection (27) within the constraint of the cuts (18), and a second angular position in which the first projection (26) is within the constraint of the cuts (18) and the second projection (27) is beyond the constraint of the cuts (18).

4. The door block of claim 1, wherein that the cuts (18) each extend obliquely outward to an edge of flaps (17).

5. The door block of claim 2, wherein the two projections (26,27) of the catch hook (19) are form a cylinder face section (25) having the same or just slightly larger radius than the radius of the closing rod (5).

6. The door block of claim 1, wherein that the catch hook (19) comprises a first part (20) provided with a first and second projection (26,27), and a second part (21) extending substantially perpendicularly from the first part (20) and arranged to, in cooperation with the lock (13), lock the catch hook (19) in said locking position.

7. The door block of claim 6, wherein that the axis about which the catch hook pivots, the first projection (26), and the end edge (28) of the second part (21) of the catch hook (19) positioned one from another in the configuration of a triangle.

8. The door block of claim 6, wherein that the lock comprises a C-shaped lock fastened in a covering (51) and a bolt (49) positioned and adapted to be a pivoting stop for the second part of the catch hook (55) when the catch hook (55) is in said locking position.

9. The door block of claim 1, wherein that the lock is a cylinder lock (29) mounted in a lock housing (30) with an axis extending crosswise to the flaps (17) of the covering (14), wherein the housing (30) comprises at least part of an axial opening (39) for a bolt (40), and at least part of a transverse cut (46) connecting the axial opening (39) to the interior of the covering; wherein the catch hook (19) is positioned and adapted to so that the second part (21) extends into the axial opening (39) through a transverse opening (46) when the catch hook (19) is in the first angular position, and the second part (21) extends outside the axial opening (39) when the catch hook (19) is in the second angular position.

10. The door block of claim 1, wherein the covering (14) is made of hardened or case-hardened steel.

11. A door block for a door hinged on a casing around an opening in a wall which comprises a rotatable closing rod, a handle on the closing rod, a cam fitted on the closing rod for engaging a stop on the casing of the door when the door is closed and when the closing rod is rotated into the locking position, the door block comprising:

- a covering that covers the closing rod and the handle on the closing rod in the area where the closing rod is joined to the handle, and that is substantially "U"-shaped with an outward face and with first and second flaps forming the "U" extending in a direction toward the door, therein the covering is positioned substantially perpendicular to the closing rod when mounted;
- cuts in the first and second flaps that define an opening in the flaps that is sized and positioned so that when mounted the closing rod is inserted into each opening;
- a block extending from the covering and from the first and second flaps toward the door when mounted wherein the stop extends a distance so that the door handle in its closed position is disposed between the stop and the door;
- a catch-hook with an arcuate edge, said arcuate edge being female and being sized and positioned to engage the closing rod positioned in the cuts so that at least a portion of the arcuate edge is between the closing rod and the door, and with a body extending outward from the arcuate edge, wherein the body is pivotally mounted through a bearing to the covering and has a projection for in the locked position abutting against a locking device; and
- the locking device sized and positioned when in a locked position to abut the body of the catch-hook to prevent rotation of the arcuate edge of the catch-hook away from the closing rod, thereby preventing the closing bar from exiting the cuts, and when in an unlocked position allowing the catch-hook to rotate such that the arcuate edge is substantially removed from the closing rod to allow the rod to be removed from the cuts.

12. The door block of claim 11 wherein the flaps extend a distance toward the door greater than the diameter of the closing rod.

13. The door block of claim 11 wherein the flaps extend to the proximity of the outer side of the door in the locking position of the door block and together with the covering in this locking position encompass the part of the handle that adjoins the closing rod.

14. The door block of claim 11 wherein the cuts are extending obliquely outward in a direction of the handle from the closing rod so that when mounted a portion of the flap is between the closing rod and the door.

15. The door block of claim 11 wherein the arcuate edge of the catch-hook extends in a direction toward the covering a distance and in such a way that the closing rod during insertion in the cuts of the first and second flaps automatically turns the catch-hook into locking position.

16. The door block of claim 11 wherein the arcuate edge has same or just slightly larger radius than the radius of the closing rod.

17. The door block of claim 11 wherein the arcuate edge, the bearing, and the projection on the catch-hook that in the locked position abuts against a locking device are situated to form a triangle.

18. The door block of claim 11 wherein the locking device is a "C"-shaped lock fastened in the covering comprises a bolt which acts as a stop for the body of the catch-hook when the bolt is positioned in a locking position.

19. The door block of claim 11 wherein the covering (14) is made of hardened or case-hardened steel.

20. The door block of claim 11 wherein the locking device is a cylinder lock mounted in a lock housing with an axis extending crosswise to the flaps of the covering, and wherein in the lock housing is constructed partly an axial opening for a bolt and has a transverse cut connecting the axial opening to the interior of the covering; and is positioned and sized so that the projection on the body of the catch-hook extends into the axial opening through a transverse opening when the catch-hook is in an unlocked position, and is outside the axial opening when the catch-hook is in the locked position.

21. A door block for a door which is hinged on a casing around an opening in a wall, whereby the door comprises a rotatable closing rod, a handle on the closing rod, and a cam fitted on the closing rod for engaging with a keeper on the casing when the door is closed and the closing rod rotated into locking position by means of the handle, the door block comprising:

- a blocking device arranged to in the blocking position extend across the closing rod with parts which, at least on the side of the closing rod that is facing in the opposite direction of the handle, are near the outer side of the door; and
- a locking device mounted on the blocking device and arranged to, in the blocking position of the door block, lock the blocking device on the closing rod, wherein the blocking device comprises a, seen in cross section, mainly U-shaped covering in form of a body having projecting flaps extending to the proximity of the outer side of the door in the locking position of the door block and together with the body during this encompassing the part of the handle that adjoins the closing rod, wherein the flaps of the covering are made flushing cuts for in the blocking position receiving the closing rod, and wherein the locking device comprises a catch hook pivotally mounted in the covering and having a projection for in the blocking position locking the closing rod in the cuts; and
- a lock for locking the catch hook in said locking position.

* * * * *